United States Patent
Hassel et al.

(10) Patent No.: US 12,244,041 B2
(45) Date of Patent: Mar. 4, 2025

(54) METHOD FOR THE CONTINUOUS TREATMENT OF MULTIPHASE FLUID FLOWS

(71) Applicant: HENGST SE, Muenster (DE)

(72) Inventors: Florian Hassel, Haltern am See (DE); Mathias Diekjakobs, Steinfurt (DE); Eike Stitterich, Senden (DE); Martin Roelver, Havixbeck (DE)

(73) Assignee: HENGST SE, Muenster (DE)

( * ) Notice: Subject to any disclaimer, the term of this patent is extended or adjusted under 35 U.S.C. 154(b) by 0 days.

(21) Appl. No.: 18/573,160

(22) PCT Filed: Jun. 21, 2022

(86) PCT No.: PCT/EP2022/066888
§ 371 (c)(1),
(2) Date: Dec. 21, 2023

(87) PCT Pub. No.: WO2023/274787
PCT Pub. Date: Jan. 5, 2023

(65) Prior Publication Data
US 2024/0304837 A1 Sep. 12, 2024

(30) Foreign Application Priority Data
Jul. 1, 2021 (DE) .......................... 102021116943.7

(51) Int. Cl.
*H01M 8/04* (2016.01)
*H01M 8/04089* (2016.01)
(Continued)

(52) U.S. Cl.
CPC ... *H01M 8/04097* (2013.01); *H01M 8/04164* (2013.01); *H01M 8/04291* (2013.01)

(58) Field of Classification Search
CPC ......... H01M 8/04097; H01M 8/04164; H01M 8/04291
See application file for complete search history.

(56) References Cited

U.S. PATENT DOCUMENTS

2003/0019363 A1* 1/2003 Grover .............. H01M 8/04291
429/444

FOREIGN PATENT DOCUMENTS

| CN | 104812876 A | 7/2015 |
|---|---|---|
| DE | 20302824 U1 | 7/2004 |

(Continued)

OTHER PUBLICATIONS

International Search Report, mailed Nov. 21, 2022, issued in corresponding PCT Patent Application No. PCT/EP2022/066888, Filed Jun. 21, 2022, including English translation of the ISR.
(Continued)

*Primary Examiner* — Olatunji A Godo
(74) *Attorney, Agent, or Firm* — PERRY + CURRIER INC.

(57) ABSTRACT

The invention relates to a method for the continuous treatment of multiphase fluid flows, in particular during the operation of fuel cells, comprising the following steps: a) providing a multiphase fluid flow comprising a gas phase and a liquid phase, wherein the gas phase comprises a carrier substance and a process substance, wherein the liquid phase comprises the process substance, b) introducing the multiphase fluid flow into a continuously operable rotating separator, c) at least partially separating the liquid phase from the multiphase fluid flow by means of the rotating separator to produce a treated fluid flow comprising a treated gas phase, wherein the treated gas phase comprises the carrier substance and the process substance, wherein the quantitative proportion of the process substance in the treated gas phase
(Continued)

is 50% or more of the quantitative proportion of the process substance in the gas phase of the multiphase fluid flow.

10 Claims, 1 Drawing Sheet

(51) Int. Cl.
  *H01M 8/04119* (2016.01)
  *H01M 8/04291* (2016.01)

(56) References Cited

FOREIGN PATENT DOCUMENTS

| | | |
|---|---|---|
| DE | 102011116679 A1 | 4/2013 |
| DE | 202015105000 U1 | 12/2016 |
| DE | 102016124098 A1 | 6/2018 |
| DE | 102017215739 A1 | 3/2019 |
| DE | 102017221309 A1 | 5/2019 |
| EP | 3189882 A1 | 7/2017 |
| GB | 2337473 A | 11/1999 |

OTHER PUBLICATIONS

Search Report, dated Feb. 14, 2022, issued in corresponding German Patent Application No. 102021116943.7, Filed Jul. 1, 2021, including English translation of the Search Report.
CNIPA, Office Action, Nov. 1, 2024 re Chinese Patent Application No. 201280077312 with English translation.

\* cited by examiner

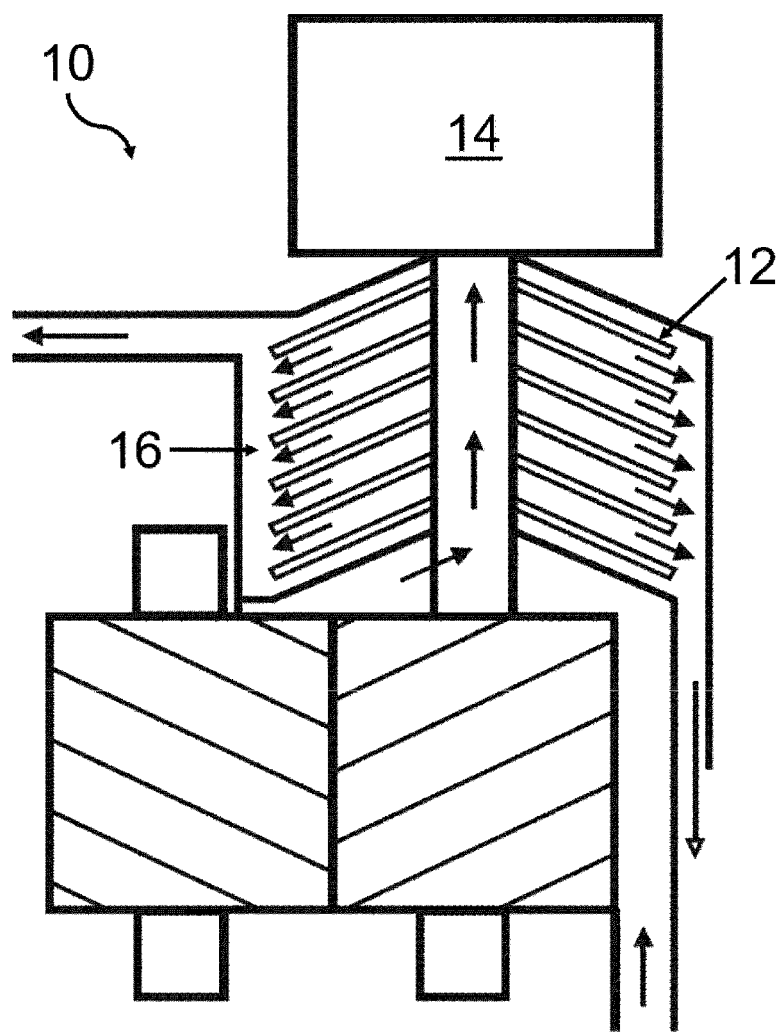

METHOD FOR THE CONTINUOUS TREATMENT OF MULTIPHASE FLUID FLOWS

The invention relates to a method for the continuous treatment of multiphase fluid flows, a rotating separator for use in a corresponding method, and a fuel cell system for carrying out the corresponding method. Also disclosed is a use of corresponding rotating separators in the continuous treatment of multiphase fluid flows.

The subject-matter of the invention is defined in the present specification.

The use of fuel cells in the field of vehicle technology has been considered a promising possibility for several years to reduce the dependence on fossil raw materials such as mineral oil. The fuel cell represents one of the most important alternatives for using batteries such as lithium ion batteries. Compared to battery technology, fuel cell technology has specific advantages, in particular with regard to the practical handling of the fuel, the storage potential and refilling times, as well as the potential possibility of using the existing pipeline and storage infrastructure.

In fuel cells, oxygen is converted with a fuel, for example hydrogen, methane or methanol, into water and optionally other reaction products under controlled reaction conditions, wherein the reaction steps of the redox reaction occur spatially separated. For this purpose, the fuel cell consists of an anode and a cathode which are separated from one another by an electrolyte, for example an electrolyte membrane.

The reactants are continuously supplied to the fuel cell during operation, wherein the fuel is mostly used superstoichiometrically. This means that a sophisticated system for the fluid line is required for the smooth operation of a fuel cell. In order to ensure the most efficient possible operation of the fuel cell and to ensure a high utilization of the employed materials, it is in particular necessary to at least partially recirculate the fluid flows exiting from the fuel cell, in particular the superstoichiometrically used fuel, into the fuel cell. However, this is associated with considerable problems in practice, in particular because the fluid flows exiting the fuel cell routinely comprise the reaction product of the chemical reaction, mostly water, which is present at least partially in condensed form. During recirculation of the exiting operating gases, it is usually important to prevent the water produced in the fuel cell and largely condensed from also being fed back into the fuel cell where it could otherwise lead to unwanted flooding of the fuel cell stack, for example.

For this reason, a water separator is often employed in the fluid line system used for recirculation, or at least in the fluid line system used with the anode.

Passive water separators are used for this purpose in the prior art. However, these systems can be associated with considerable disadvantages in the assessment of the inventors. For example, they can lead to undesired back pressures or pressure drops in the fluid line system. In particular if the fuel cell is operated at a low load and the fluid flow exiting the fuel cell stack is therefore comparatively weak, such systems additionally manifest poor separation levels with regard to the condensed water. In principle, the separation performance of the passive systems known from the prior art is routinely perceived as inadequate.

The inventors of the present invention have recognized that the problems known from the prior art can be solved by the use of a rotating separator, in particular if it is driven, for example, by a separate electric motor and therefore not only removes condensed by-products from the fluid flow with excellent separation performance, but also actively ensures sufficient flow in the fluid line system from its rotation, almost in the manner of a turbine.

The fundamentally advantageous use of rotating separators for the continuous treatment of multiphase fluid flows can, however, according to the inventors' knowledge, also be associated with disadvantages which can be regarded as problematic for certain applications, in particular when used in the fluid line system in a fuel cell. In this design, which is extremely advantageous per se, surprising, unforeseen effects have occasionally occurred, which have led to unwanted losses in the performance of the fuel cell.

Without wishing to be bound by this theory, the inventors of the present invention assume that these performance losses of the fuel cell could be a consequence of the particular performance of the rotating separator, which can occur in particular when the rotating separator is operated at a particularly high rotational speed or separation performance. In this case, the water separation by the powerful rotating separator can function so well that the amount of water as a substance in the gas phase emerging from the rotating separator is also greatly reduced. At the same time, the now very dry carrier gas of the fuel cell is provided by the rotating separator even at a low load with sufficient pressure and circulates through the fuel cell. For the smooth operation of a fuel cell, however, it is often necessary for the electrolyte membrane used to separate the electrodes to be kept moist in order to enable sufficient ion transport. Without wishing to be bound by this theory, the inventors of the present invention assume that the advantageous use of a rotating separator in a fuel cell, in particular in the fluid line system connected to the anode, increases the risk compared to conventional separators that the electrolyte membrane does not have sufficient membrane moisture.

The object of the present invention was to eliminate the above-described problems and to specify a method for the highly advantageous and innovative design of the use of a rotating separator in a fuel cell system which is particularly suitable for the continuous treatment of multiphase fluid flows, in particular in the operation of fuel cells, and therefore avoids the disadvantages described above and enables efficient operation of the fuel cell.

By means of the method to be specified for continuous treatment of multiphase fluid flows, in particular during operation of fuel cells, it should be made possible to obtain a treated fluid flow even when a rotating separator is used, with which an undesired drying of the electrolyte membrane can be prevented.

The inventors of the present invention have now recognized that, in order to achieve the above-described objects, a method for continuously treating multiphase fluid flows has to be designed such that, in the case of an advantageous use of the rotating separator, the molar fraction of the process substance in the treated gas phase is not reduced by more than 50% compared to the original gas phase.

The above-mentioned objects are correspondingly achieved by methods for continuously treating multiphase fluid flows as defined in the present specification, or by rotating separators and uses as disclosed below.

Such features of subjects according to the invention, which are referred to below as preferred, are combined with other features referred to as preferred in particularly preferred embodiments. Combinations of two or more of the embodiments referred to below as particularly preferred are thus very particularly preferred. Also preferred are embodiments in which a feature designated as preferred to any extent is combined with one or more additional features designated as preferred to any extent. Features of preferred rotating separators and uses are derived from the features of preferred processes.

The invention relates to a method for continuously treating multiphase fluid flows, in particular during operation of fuel cells, comprising the steps of:
a) providing a multiphase fluid flow comprising a gas phase and a liquid phase, wherein the gas phase comprises a carrier substance and a process substance, wherein the liquid phase comprises the process substance,
b) introducing the multiphase fluid flow into a continuously operable rotating separator, wherein the rotating separator is preferably operated continuously or at intervals, particularly preferably continuously,
c) at least partially separating the liquid phase from the multiphase fluid flow by means of the rotating separator to produce a treated fluid flow comprising a treated gas phase,
wherein the treated gas phase comprises the carrier substance and the process substance, wherein the molar fraction of the process substance in the treated gas phase is 50% or more of the molar fraction of the process substance in the gas phase of the multiphase fluid flow.

The method according to the invention is particularly suitable for use in the operation of fuel cells, in particular polymer electrolyte fuel cells, i.e., fuel cells which use a polymer membrane as the electrolyte. The use of the method according to the invention in the anode-side fluid line system of the fuel cell is preferred here.

However, the inventors of the present invention have come to the conclusion that the knowledge gained during the optimization for the fuel cell for the continuous treatment of multiphase fluid flows using a rotating separator is in principle also relevant for other areas of application which require careful control of the process material concentration in a gas phase because, for example, downstream devices and elements require a certain minimum amount of process material.

In step a) of the method according to the invention, a multiphase fluid flow is provided which comprises a gaseous and a liquid phase. A corresponding multiphase fluid flow can be formed, for example, in a fuel cell in which water is formed by the redox reaction and is conducted in condensed form together with the excess fuel from the fuel cell.

From the point of view of the inventors, it is in principle possible for the multiphase fluid flow to also comprise a solid phase, for example particulate impurities, in certain applications, but this is less preferred for most applications and should in particular be avoided in principle during the operation of fuel cells. In any case, it can be regarded as an advantage of the method according to the invention that any present particulate impurities in the fluid flow can be separated automatically and thoroughly by the use of a rotating separator.

The multiphase fluid flow to be provided according to the invention comprises a process substance in the liquid phase. Within the scope of the present invention, this process substance is the compound whose concentration must be carefully controlled in the method according to the invention. In most relevant applications, in particular in the preferred use of the method according to the invention in a polymer electrolyte fuel cell, the process substance is water.

In addition to the liquid phase, the process substance is also present in the gas phase, wherein a phase equilibrium between the process substance in the gas phase and the liquid phase is routinely set depending on the temperature and the prevailing pressure, or wherein the polyphase system will at least strive to achieve this state.

In addition to the gaseous process substance, the gas phase also comprises the carrier substance. In simplified terms, the expression "carrier substance" refers to all gaseous components which are not the process substance. In the method according to the invention, the carrier substance is used primarily to provide a sufficient gas volume and to enable transport of the process substance in liquid and gaseous form through a fluid line system. In practice, in particular in the use in fuel cells, the carrier substance is usually the superstoichiometrically supplied fuel or a mixture containing the fuel, for example in combination with nitrogen.

In accordance with the above statements, the multiphase fluid flow provided in step b) of the method according to the invention is introduced into a continuously operable rotating separator. Continuously operable rotating separators are basically known to a person skilled in the art from other fields of application and differ from other rotating separators which cannot be operated continuously, for example centrifuges. A person skilled in the art refers to such separators as rotating separators which have one or more elements whose rotation causes or promotes a separation effect.

By means of this rotating separator, the liquid phase, i.e., the phase which comprises the liquid process substance, is at least partially separated from the multiphase fluid flow in step c), wherein in principle substantial separation, preferably of 98 wt. % or more of the liquid phase, particularly preferably 99 wt. % or more of the liquid phase, is preferred.

By this work step c), a treated fluid stream is obtained which comprises at least one treated gas phase. In light of the above statements, it is understandable that this treated fluid flow can potentially comprise a liquid and a gas phase so that the treated fluid flow can also be a multiphase system which can even be particularly preferred in some cases, as is disclosed below.

It is now important for the method according to the invention that the treated gas phase comprises not only the carrier substance material but also the process substance, i.e., the process substance in gaseous form. In the opinion of the inventors, it is essential here that the molar fraction of the process substance in the treated gas phase, i.e., the gas phase of the treated fluid stream, as it exits the continuously operable rotating separator, is not reduced too much despite the performance of the rotating separator, wherein a halving of the molar fraction of the process material in the gas phase compared to the molar fraction of the same process material in the gas phase of the multiphase fluid stream could be identified as a sensible limit value with which excellent performance could be achieved in particular in the operation of polymer electrolyte fuel cells over a wider parameter range and under a wide variety of operating conditions.

It has proven to be particularly advantageous to operate the method according to the invention such that minimal differences in the relative composition of the treated gas phase are set compared to the gas phase of the multiphase fluid flow. In particular, this allows those fuel cells which are operated at a low load and in which comparatively little water is generated can thereby be operated reliably over longer periods of time, wherein the fluid flow in the fluid line system can be provided with the necessary pressure by the rotating separator. A method according to the invention is therefore preferred, wherein the molar fraction of the process substance in the treated gas phase is 80% or more, preferably 90% or more, particularly preferably 95% or more, most preferably 95 to 105%, of the molar fraction of the process substance in the gas phase of the multiphase fluid flow.

This relation between the composition of the gas phase upstream and downstream from the rotating separator can also be expressed by means of the ratio of the partial pressures between the carrier material and the process substance, in accordance with professional understanding. An alternative method according to the invention is therefore one in which the ratio of the partial pressure of the process material to the partial pressure of the carrier material is reduced by 50% or less from the gas phase of the multiphase fluid stream to the treated gaseous phase. A method according to the invention is preferably analogous, wherein the ratio of the partial pressure of the process substance to the partial pressure of the carrier substance is reduced by 20% or less, preferably 10% or less, particularly preferably 5% or less, most preferably basically not at all, from the gas phase of the multiphase fluid flow to the treated gas phase.

To determine the change in the quantity of the process substance in the gas phase upstream and downstream from the rotating separator, a person skilled in the art can rely on customary determination methods from which he selects a suitable determination method depending on the process parameters, in particular depending on the process substance. For organic process substances, a person skilled in the art can remove samples, for example, and investigate them by gas chromatography. For the routinely very relevant case of water as a process substance, the determination can be made, for example, using a conventional hygrometer, wherein in preferred embodiments, a hygrometer can be placed in front of and behind the rotating separator. Depending on the selected measurement method, it is also expedient to determine the total pressure of the gas phase in order, for example, to calculate the partial pressure of the process substance.

In accordance with professional understanding, the molar fraction or the partial pressures are determined under the conditions of the method, i.e., at the temperature and the pressure prevailing during operation of the method according to the invention.

The molar fraction or the partial pressures are clearly defined at every moment, and are themselves not dependent on the measurement method which only influences the accuracy of the determination. A person skilled in the art is therefore free to select the employed measurement method, in particular if the determined change is far enough from the defined limit value that it is not reached even taking into account the measurement error. A person skilled in the art will usually only have to resort to a more accurate measurement method if the distance from the defined limit value lies within the measurement uncertainty.

The inventors of the present invention have identified various options with which the maximum change in the molar fraction of the process substance in the gas phase, which is to be set in the method according to the invention, and the preferred values for this change can be realized. According to the inventors of the present invention, it is particularly important to prevent condensation of the process substance contained in the gas phase in the rotating separator, by means of which the molar fraction of this process substance in the gas phase would be reduced, by means of suitable design and process engineering measures, or at least to reduce the extent thereof. This represents a particular challenge, since the rotating separator at least partially removes the liquid phase of the multiphase fluid flow from equilibrium, thereby promoting condensation.

In the methods known from the prior art apart from the fuel cell, which are operated using a rotating separator, this problem is hardly relevant since in these applications it is usually preferable anyway if the condensed process substance can be separated as completely as possible with the other parts to be removed.

The options for controlling the partial pressure change identified by the inventors of the present invention, which are specified below, can be suitably selected and combined by a person skilled in the art in the opinion of the inventors of the present invention, so that a method is obtained which is compatible with the design used by a person skilled in the art. From the perspective of the inventors, it has proven to be particularly advantageous to combine two or more, preferably three or more, particularly preferably four or more of the options described below, wherein particularly preferably all of the options described below are used.

Many of the rotating separators used in the prior art, which are configured to purify a gas stream as completely as possible, have elements which serve for the physical-chemical bonding of water, for example drying agents or refrigeration dryers. In the opinion of the inventors, the rotating separator to be used in the method according to the invention should not comprise any of these elements. A method according to the invention is therefore preferred, wherein the rotating separator does not comprise any means for removing the gaseous process substance from the gas phase, in particular by chemical bonding and/or adsorption of the process substance. This embodiment also has the advantage that corresponding rotating separators are less maintenance-intensive, and the need no longer applies to exchange the desiccant from time to time.

By dispensing with specific devices for drying the gas phase, the inventors of the present invention have identified a particularly efficient way of influencing the change in the amount of substance. In principle, it would be intuitively desirable to remove the liquid phase in the multiphase fluid flow as much as possible in order to therefore set the minimum mass fraction of the liquid phase in the treated fluid flow of 1% or less, preferably 0.5% or less, particularly preferably 0.1% or less, which can also be preferred for certain applications.

However, the inventors of the present invention have recognized that an undesired condensation of the gaseous process substance from the gas phase can be avoided particularly efficiently if the liquid phase, despite the potentially high performance of the rotating separator, is not completely removed from the fluid flow so that the treated fluid flow also comprises residues of the liquid phase which are in equilibrium with the gas phase. The adjustment of this method control is advantageously particularly simple, namely through the targeted control of the performance of the rotating separator or its inherent separation efficiency for water. In this case, it has proven particularly expedient if the remaining portion of condensed process substance in the liquid phase is present in the form of small particles having a mean droplet size of 1 µm or less.

The inventors of the present invention have identified particularly suitable areas for the described conflict of objectives between the greatest possible separation and a retention of liquid phase to ensure the smallest possible change in the molar fraction of the process substance, with which the method according to the invention can be advantageously operated particularly, in particular in the operation of a polymer electrolyte fuel cell. A method according to the invention is namely preferred, wherein the separation in step c) is carried out in such a way that the treated fluid stream comprises the liquid phase in a mass fraction of 0.05 to 2%, preferably 0.1 to 1%, particularly preferably 0.2 to 0.5%, relative to the mass of the treated fluid stream.

In the course of considering how the undesired separation of the process substance from the gas phase can be prevented, the inventors of the present invention have recognized that the temperature of the rotating separator can advantageously be set to reduce the extent of undesired condensation in the rotating separator. In accordance with professional understanding, the temperature of the inner walls of the working chamber is relevant, i.e., of the room, through which the multiphase fluid flow is guided. In particular in combination with a targeted control of performance for setting a residual amount of liquid phase, this method has proven to be an excellent solution for providing a treated fluid flow which enables long-term fault-free operation, for example in a fuel cell with a polymer electrolyte membrane. In this case, with regard to easier handling, it is possible to clad the rotating separator on the outside with thermal insulation, which is preferred for many applications. It is particularly preferred to equip the rotating separator with a heating device so that the temperature of the rotating separator can be controlled in the method. A method according to the invention is therefore preferred, wherein the rotating separator on the inner walls of the working chamber has a temperature of 60° C. or more, preferably 70° C. or more, particularly preferably 80° C. or more.

In particular in combination with a temperature-controlled rotating separator and/or when heated fluid flows are used, it has also proven to be advantageous to provide a reservoir of the liquid process substance in the rotating separator, the gas space of which is in fluid-conducting connection with the working chamber. This makes it possible to enable additional saturation of the gas phase with the process substance via the preferably temperature-controlled liquid in the reservoir, which counteracts unwanted condensation. This reservoir can advantageously be supplied directly from the separated liquid phase. This embodiment has also proven to be particularly advantageous because it makes it possible to enable a minimum extent of the saturation of the gas phase with the process substance.

A further option for controlling the change in the molar fraction of the process substance in the gas phase consists, in the view of the inventors, in the suitable selection of the type of rotating separator since, given a specific selection of rotating separators, due to their general operating principle, it is easier to avoid excessive changes in the molar fraction of the process substance, or the method parameters can be adapted particularly easily to counteract excessive change. Preference is hence given to a method according to the invention, wherein the rotating separator is a turbo machine, a rotating filter, a rotating channel separator or a disk separator, wherein the rotating separator is preferably a disk separator. Disc separators are also preferred because they can routinely be operated very energy-efficiently so that the method according to the invention is energy-saving compared to the prior art.

Of the rotating separators described above, the use of a disk separator is particularly preferred according to the knowledge of the inventors of the present invention. The method according to the invention can therefore be operated particularly advantageously, especially when using a disk separator in the fluid line systems of a fuel cell with a polymer electrolyte membrane, in particular because disk separators are well-suited for ensuring a continuous fluid flow.

The use of a disk separator is also advantageous in the opinion of the inventors of the present invention, because it can control the extent of the undesired condensation of the process substance from the gas phase particularly well through design measures. In this case, the inventors have recognized that it is particularly advantageous to not choose too large a distance between the disks of the disk separator. A preferred method according to the invention is namely one in which the rotating separator is a disk separator, wherein the distance between the disks is less than 0.6 mm, preferably less than 0.3 mm, particularly preferably less than 0.2 mm.

In addition, the inventors propose to reduce the undesired condensation of disks with particularly smooth surfaces, which can be achieved, for example, by a suitable surface treatment in the production method. Without wishing to be bound by this theory, the inventors of the present invention assume that the particularly smooth surfaces act as condensation nuclei to a lesser degree, and the extent of condensation is thereby reduced. A method according to the invention is therefore preferred, wherein the rotating separator is a disk separator, wherein the disks have an average roughness depth Rz according to DIN EN ISO 1302:2002 of 25 μm or less, preferably 10 mm or less, particularly preferably 6.3 mm or less.

It has proven to be most advantageous in the eyes of the inventors of the present invention to form the disks from a material that repels the process substance, or to coat the surface with a corresponding material, in contrast to the usual designs in the prior art. In the case of water as a process substance, it can for example be a hydrophobic material, for example polytetrafluoroethylene or other perfluorocarbon compounds. Without wishing to be bound by this theory, the inventors of the present invention assume that corresponding repellent surfaces allow only a minor degree of condensation of the process substance. Accordingly, a method according to the invention is preferred, wherein the rotating separator is a disk separator, wherein at least one of the disks, preferably all disks, particularly preferably all components of the disk separator which are in contact with the fluid flow, consist of a material which repels the process substance or are coated with a material which repels the process substance, wherein the process substance has a contact angle on the material which repels the process material in the range of 70° or more, preferably 80° or more, particularly preferably 90° or more, most preferably 100° or more.

In addition, it is sensible in the eyes of the inventors to keep a cooling of the gas by expansion from occurring which could promote condensation of the process substance from the gas phase. The inventors of the present invention correspondingly propose to design or to operate the rotating separator such that an isenthalpic pressure reduction does not occur which could lead to cooling via the Joule-Thomson effect. A method according to the invention is therefore preferred, wherein the difference in the total pressure between the gas phase of the multiphase fluid flow upstream from the rotating separator and the treated gas phase of the treated fluid flow after the rotating separator is less than 1%, preferably less than 0.5%, and particularly preferably less than 0.1%.

The method according to the invention can advantageously be carried out in such a way that the separated liquid phase and/or the treated gas phase from the method can be returned into the working device which serves to provide the multiphase fluid flow. The corresponding method according to the invention can therefore be operated in a circuit, in particular a closed circuit.

In this case, it is possible, for example, to supply the separated liquid phase of a working device in which the multiphase fluid flow provided in step a) is generated. This can be, for example, steam machines or similar devices. In this respect, a method according to the invention is preferred, wherein the liquid phase separated in step c) is supplied at least partially to a working device in which the multiphase fluid flow provided in step a) is generated.

However, the procedure described above is generally not desirable for use during the operation of fuel cells. In fuel cells, however, the removed liquid phase should be supplied to a discharge system with which the separated liquid phase is removed from the fuel cell system in order to prevent undesired flooding of the fuel cell. When used in a fuel cell, however, as explained above, it is particularly advantageous and expedient to return the treated fluid flow produced in step c) into the fuel cell. A method according to the invention is consequently preferred, wherein the treated fluid flow produced in step c) is supplied at least partially to a working device in which the multiphase fluid flow provided in step a) is generated. In light of the above statements, it is clear that such a method according to the invention is preferred, wherein the working device is a fuel cell, in particular a polymer electrolyte fuel cell.

The inventors of the present invention have recognized that at very low and very high temperatures, it can be particularly challenging to operate the method according to the invention, in particular in combination with a fuel cell. In this case, it is particularly challenging to control the change in the molar fraction of the process substance in the gaseous component in extreme temperature ranges according to the invention. Accordingly, the inventors of the present invention propose certain temperature ranges in which the method according to the invention can be carried out particularly effectively. Against this background, a method according to the invention is preferred, wherein the multiphase fluid flow and/or the treated fluid flow has a temperature in the range of −40 to 120° C., preferably in the range of 0 to 110° C.

As explained above, it is regarded as a particularly advantageous aspect of the present invention if the change in the molar fraction of the process substance in the gas phase is controlled by the performance of the rotating separator in which it deliberately allows a certain part of the liquid phase to pass. For this purpose, it has proven to be particularly advantageous to equip the rotating separator with an electric motor so that it can be controlled via the performance of the electric motor. A method according to the invention is therefore preferred, wherein the rotating separator is driven by an electric motor, wherein the electric motor is preferably installed in a capsule that is impermeable to the carrier material and/or the process substance, wherein the delivery performance and/or the separation performance of the rotating separator can preferably be controlled by the performance of the electric motor.

As explained above, it is an advantageous embodiment to operate the rotating separator such that a small part of the liquid phase remains in the treated fluid flow. However, this can be associated with problems during the subsequent use of the fluid flow. It is possible, for example, for condensation of the process substance to already occur upstream of the rotating separator to be deposited on the walls of the fluid line system. Such deposits can be entrained by the fluid flow so that unexpected fluctuations in the introduction of liquid into the rotating separator can occur, which could then lead to an undesirably high proportion of liquid phase in the treated fluid flow. In order to prevent this, simpler, non-rotating pre-separators can be provided which prevent the entry of such condensates into the rotating separator. A corresponding method according to the invention is preferred, wherein the multiphase fluid flow is passed through a, preferably non-rotating, pre-separator before being introduced into the continuously operable rotating separator.

Depending on the design of the fluid line system, further condensation can also occur downstream from the rotating separator. It cannot also be ruled out that the content of liquid phase after passing through the rotating separator is still too high for certain applications. In these cases, the use of a post-separator is suitable which can advantageously be arranged directly upstream from the inlet of the working device in order to reduce the content of liquid phase to the desired extent in case of doubt. A method according to the invention is therefore preferred, wherein the treated fluid flow is guided through a preferably non-rotating post-separator.

Starting from the collected findings and the basic idea of the invention, the inventors of the present invention could identify specific operating parameters by means of which the method according to the invention can be operated particularly advantageously.

A method according to the invention is specifically preferred, wherein the rotating separator has a level of separation of 70% or more, preferably 80% or more, particularly preferably of 90% or more, with respect to liquid particles having a diameter of less than 1 μm.

A method according to the invention is also preferred, wherein the multiphase fluid flow is an aerosol, wherein the liquid phase in the multiphase fluid flow is preferably present as liquid particles having a diameter d50 of less than 10 μm, preferably less than 5 μm, particularly preferably less than 2 μm.

From the point of view of the inventors, such methods according to the invention are particularly advantageous in which the gas phase as a carrier substance comprises a multi-substance system, wherein it is particularly advantageous with a view to the efficiency of the process control if the used carrier substance dissolves as little as possible in the liquid phase of the multiphase fluid flow. A method according to the invention is therefore preferred, wherein the gas phase as a carrier substance comprises two or more different substances. A method according to the invention is also preferred, wherein the combined mass fraction of all carrier substances in the liquid phase of the multiphase fluid flow is less than 5%, preferably less than 3%, particularly preferably less than 1%, relative to the mass of the liquid phase of the multiphase fluid flow.

The inventors of the present invention were also able to identify particularly suitable carrier substances. A method according to the invention is specifically preferred, wherein the carrier substance is selected from the group consisting of helium, neon, argon, nitrogen, oxygen, hydrogen, and mixtures of these substances, wherein the carrier substance is preferably selected from the group consisting of nitrogen, hydrogen, and mixtures of these substances.

For the use of the method according to the invention during the operation of fuel cells, the inventors were also able to identify a particularly suitable mixture for the carrier substance. In this case, a method according to the invention is preferred, wherein the carrier substance in the gas phase of the multiphase fluid flow comprises hydrogen with a molar fraction of 30 to 100%, preferably a mass fraction of 50 to 95%, and nitrogen with a mass fraction of 0 to 70%, preferably a mass fraction of 5 to 50%, based on the mass of the gas phase.

In light of the above statements, it is apparent to a person skilled in the art that the method according to the invention is particularly suitable for use in fuel cells, in particular polymer electrolyte fuel cells, and in this respect primarily in their anode-side fluid line system or fluid management system. In this intended use, the relevant process substance whose concentration should be specifically controlled is water. A method according to the invention is consequently preferred, wherein the process substance is water. In this context, a method according to the invention is also particularly preferred, wherein the multiphase fluid flow is generated in step a) by a working device, wherein the working device is preferably a fuel cell, in particular a polymer electrolyte fuel cell.

For the process substance of water and the operation of a polymer electrolyte fuel cell, the inventors were able to identify a particularly suitable range of the absolute molar fractions in the treated gas stream. A method according to the invention is specifically preferred, wherein the molar fraction of the process substance in the treated gas phase is in the range of 10 to 40%, preferably 13 to 35%, particularly preferably 16 to 30%.

In light of the above statements, a person skilled in the art recognizes that the invention also relates to a rotating separator. The invention therefore also relates to a rotating separator for use in a method according to the invention, wherein the rotating separator can be operated continuously, wherein the rotating separator is configured to at least partially separate the liquid phase of a multiphase fluid flow comprising a process substance from the gas phase comprising a carrier substance and the process substance, so that the obtained treated gas phase comprises the carrier substance material and the process substance, and so that the molar fraction of the process substance in the treated gas phase is 50% or more of the molar fraction of the process substance in the gas phase of the multiphase fluid flow.

The rotating separator according to the invention is particularly preferred because the method according to the invention can be implemented particularly efficiently therewith. Preferred embodiments of the rotating separator according to the invention are specified below, which serve to realize preferred methods according to the invention and can be regarded as particularly advantageous for these reasons.

A rotating separator according to the invention is specifically preferred, wherein the rotating separator is a turbo machine, a rotating filter, a rotating channel separator or a disk separator, wherein the rotating separator is preferably a disk separator.

A rotating separator according to the invention is also preferred, wherein the rotating separator comprises a heating device for controlling the temperature of the inner walls of the working chamber.

A rotating separator according to the invention is also preferred, wherein the rotating separator is a disk separator, wherein the distance between the disks is less than 0.6 mm, preferably less than 0.3 mm, particularly preferably less than 0.2 mm.

A rotating separator according to the invention is also preferred, wherein the rotating separator is a disk separator, wherein the disks have an average roughness depth Rz of 25 μm or less, preferably 10 μm or less, particularly preferably 6.3 μm or less.

Furthermore, a rotating separator according to the invention is preferred, wherein the rotating separator is a disk separator, wherein at least one of the disks, preferably all disks, particularly preferably all components of the disk separator which are in contact with the fluid flow, consist of a material which repels the process substance or are coated with a material which repels the process substance, wherein the process substance has a contact angle on the material which repels the process material in a range of 70° or more, preferably 80° or more, particularly preferably 90° or more, most preferably 100° or more.

A rotating separator according to the invention, comprising a non-rotating pre-separator and/or a non-rotating post-separator, is likewise preferred.

A rotating separator according to the invention is also preferred, wherein the rotating separator has a level of separation of 70% or more, preferably 80% or more, particularly preferably of 90% or more, with respect to liquid particles having a diameter of less than 1 μm.

Also disclosed in the context of the invention is the use of such a rotating separator for continuously treating multiphase fluid flows during the operation of fuel cells, in particular polymer electrolyte fuel cells, in order to extend the service life of a fuel cell during operation with a performance that is less than 20%, preferably less than 10%, of the maximum performance.

Finally, the invention also relates to a fuel cell system, in particular a polymer electrolyte fuel cell system, comprising a fluid line system for the fluid supply for at least one electrode of a fuel cell, in particular of the anode, wherein such a rotating separator is provided in at least one fluid line for continuously treating multiphase fluid flows.

A corresponding fuel cell system according to the invention is advantageous since the method according to the invention can be carried out therein, and the fuel cell can also be operated over longer periods of time even at a low load, wherein the electrolyte membrane is prevented from drying out. In addition, the rotating separator makes it advantageously possible to supply the fuel cell with sufficient recycled fuel even at low loads and correspondingly low performances. This advantageously achieves a high operational reliability and a long service life.

The invention and preferred embodiments of the invention are explained and described in more detail below with reference to accompanying FIGURE. In the FIGURE:

FIG. 1 shows a schematic representation of a rotating separator according to the invention in a particularly preferred embodiment, by means of which the method according to the invention can be carried out in preferred embodiments.

FIG. 1 shows a schematic representation of a rotating separator according to the invention in a particularly preferred embodiment.

The shown rotating separator 10 is suitable and intended for use in a method according to the invention, wherein the rotating separator 10 is a continuously operable disk separator.

The rotating separator 10 according to FIG. 1 is arranged in the anode-side fluid line system of a polymer electrolyte fuel cell system (not shown) and serves to continuously treat multiphase fluid flows, in particular comprising hydrogen and water.

In the example shown in FIG. 1, the rotating separator 10 is set up to separate the liquid phase of a multiphase fluid flow, in particular comprising water, at least partially from the gas phase comprising hydrogen, water and optionally nitrogen. This can advantageously take place with the rotating separator 10 according to the invention in such a way that the obtained treated gas phase comprises hydrogen and water, and the molar fraction of the water in the treated gas phase is 50% or more of the molar fraction of the water in the gas phase of the multiphase fluid flow, i.e., before treatment.

The multiphase fluid flow enters the rotating separator 10 from below, which is indicated by the solid arrow. In this case, a conveying device arranged below the working chamber 16 ensures fluid conveyance by the rotating separator 10. The rotating separator 10 comprises a disk packet consisting of a plurality of disks 12, wherein the disk packet is rotationally driven via an electric motor 14. The electric motor 14 allows the separation performance to be set. Separation takes place through the disk stack, wherein the separated liquid phase is discharged at the right edge in the shown example, which is indicated by an outlined arrow.

The treated gas phase, which also comprises gaseous hydrogen in addition to the carrier substance, is contrastingly removed to the left in the schematic representation and recycled to the fuel cell.

The rotating separator 10 according to FIG. 1 comprises a heating device (not shown) for controlling the temperature of the inner walls of the working chamber 16 and has a distance of 0.25 mm between the disks 12. The average roughness depth of the surface of the disks 12 is 6.3 μm. The disks 12 of the rotating separator 10 are made of polytetrafluoroethylene, and the inner walls of the working chamber 16 are coated with polytetrafluoroethylene.

The exemplary rotating separator 10 according to FIG. 1 has a degree of separation of 70% or more in relation to liquid particles having a diameter of less than 1 μm.

LIST OF REFERENCE SIGNS

10 Rotating separator
12 Disk
14 Electric motor
16 Working chamber

The invention claimed is:

1. A method for continuously treating multiphase fluid flows during the operation of fuel cells, comprising the steps of:
   a) providing a multiphase fluid flow comprising a gas phase and a liquid phase, wherein the gas phase comprises a carrier substance material and a process substance, wherein the liquid phase comprises the process substance, wherein the process substance is water,
   b) introducing the multiphase fluid flow into a continuously operable rotating separator,
   c) at least partially separating the liquid phase from the multiphase fluid flow by means of the rotating separator to produce a treated fluid flow comprising a treated gas phase, wherein 98% by weight or more of the liquid phase are separated,
   wherein the treated gas phase comprises the carrier substance and the process substance, wherein a molar fraction of the process substance in the treated gas phase is 50% or more of a respective molar fraction of the process substance in the gas phase of the multiphase fluid flow.

2. The method according to claim 1, wherein the separation in step c) is carried out in such a way that the treated fluid stream comprises the liquid phase in a mass fraction of 0.05 to 2%, or 0.1 to 1%, or 0.2 to 0.5%, relative to the mass of the treated fluid stream.

3. The method according to claim 1, wherein the rotating separator at the inner walls of the working chamber (16) has a temperature of 60° C. or more, or 70° C. or more, or 80° C. or more.

4. The method according to claim 1, wherein the rotating separator is a turbo machine, a rotating filter, a rotating channel separator or a disk separator.

5. The method according to claim 4, wherein the rotating separator is a disk separator, wherein the disks have an average roughness depth Rz of 25 μm or less, or 10 μm or less, or 6.3 μm or less.

6. The method according to claim 4, wherein the rotating separator is a disk separator, wherein the distance between the disks is less than 0.6 mm, or less than 0.3 mm, or less than 0.2 mm.

7. The method according to claim 4, wherein the rotating separator is a disk separator, wherein at least one of the disks, or all disks, or all components of the disk separator which are in contact with the fluid flow, consist of a material which repels the process substance or are coated with a material which repels the process substance, wherein the process substance has a contact angle of 90° or more, or 100° or more, on the material repelling the process substance.

8. The method according to claim 1, wherein the rotating separator is driven by an electric motor, wherein the electric motor is installed in a capsule that is impermeable to one or more of the carrier material and the process substance, wherein one or more of the delivery capacity and the separation capacity of the rotating separator can be controlled by the performance of the electric motor.

9. A rotating separator for use in the method according to claim 5, wherein the rotating separator can be operated continuously, wherein the rotating separator is configured to at least partially separate the liquid phase of a multiphase fluid flow comprising a process substance from the gas phase comprising a carrier substance and the process substance, so that the obtained treated gas phase comprises the carrier substance material and the process substance, and so that a molar fraction of the process substance in the treated gas phase is 50% or more of a respective molar fraction of the process substance in the gas phase of the multiphase fluid flow, wherein the rotating separator is a disk separator, and wherein the disks have an average roughness depth Rz of 25 μm or less.

10. A fuel cell system, comprising a fluid line system for a fluid supply for at least one electrode of a fuel cell, in particular the anode, wherein a rotating separator according to claim 9 is provided in at least one fluid line for continuously treating multiphase fluid flows.

* * * * *